(12) United States Patent
Henry

(10) Patent No.: US 11,048,821 B1
(45) Date of Patent: Jun. 29, 2021

(54) HOSTED SERVER SYSTEM AND METHOD FOR INTERMEDIATING ANONYMOUS FIRM MATCHING AND EXIT STRATEGY NEGOTIATIONS

(71) Applicant: eMerger.biz, LLC, Clarksville, TN (US)

(72) Inventor: Thomas M. Henry, Clarksville, TN (US)

(73) Assignee: eEmerger.biz, LLC, Clarksville, TN (US)

( * ) Notice: Subject to any disclaimer, the term of this patent is extended or adjusted under 35 U.S.C. 154(b) by 392 days.

(21) Appl. No.: 15/693,620

(22) Filed: Sep. 1, 2017

Related U.S. Application Data

(60) Provisional application No. 62/385,382, filed on Sep. 9, 2016.

(51) Int. Cl.
*G06F 21/62* (2013.01)
*G06Q 50/18* (2012.01)
*H04L 29/06* (2006.01)

(52) U.S. Cl.
CPC ....... *G06F 21/6254* (2013.01); *G06Q 50/188* (2013.01); *H04L 63/102* (2013.01)

(58) Field of Classification Search
CPC .. G06Q 50/188; H04L 63/102; G06F 21/6254
See application file for complete search history.

(56) References Cited

U.S. PATENT DOCUMENTS

| | | | |
|---|---|---|---|
| 8,249,995 B2 | 8/2012 | Sheperd | |
| 10,529,336 B1* | 1/2020 | Matthews | G06F 21/6245 |
| 2002/0072946 A1* | 6/2002 | Richardson | G06Q 10/1053 |
| | | | 705/7.14 |
| 2002/0111843 A1* | 8/2002 | Wellenstein | G06Q 10/063112 |
| | | | 705/7.14 |

(Continued)

OTHER PUBLICATIONS

Feb. 2, 2017, Federal Register, "Removal of Personally Identifiable Information from Registration Records", https://www.federalregister.gov/documents/2017/02/02/2017-02238/removal-of-personally-identifiable-information-from-registration-records.*

(Continued)

*Primary Examiner* — Jung W Kim
*Assistant Examiner* — Thomas Ho
(74) *Attorney, Agent, or Firm* — Patterson Intellectual Property Law, P.C.; Gary L. Montle

(57) ABSTRACT

Hosted server implementation is provided for intermediating anonymous firm matching and exit strategy negotiations. The system generates user accounts in response to user interaction with a hosted server interface, and matches client users based on at least an industry type and user-selected criteria, and electronically presents users with anonymized profiles corresponding to the users matched therewith. Responsive to selection of an anonymized profile, the system enables confidential and anonymous sharing of client user data corresponding to the selection criteria. Further responsive to authorization from each corresponding client user, the system generates intermediated and anonymous correspondence between a first client user and selected client (Continued)

users via a hosted server platform, wherein the hosted server interfaces substantially prevent identification of either client user participating in the intermediated correspondence.

4 Claims, 11 Drawing Sheets

(56) References Cited

U.S. PATENT DOCUMENTS

| | | | | |
|---|---|---|---|---|
| 2003/0177027 A1* | 9/2003 | DiMarco | ................ | G06Q 10/06 |
| | | | | 705/321 |
| 2005/0261956 A1* | 11/2005 | Kato | ...................... | G06Q 10/00 |
| | | | | 705/321 |
| 2005/0278205 A1* | 12/2005 | Kato | ................. | G06Q 10/1053 |
| | | | | 705/321 |
| 2006/0112086 A1 | 5/2006 | Douress et al. | | |
| 2006/0116894 A1* | 6/2006 | DiMarco | ................ | G06Q 10/00 |
| | | | | 705/321 |
| 2007/0129966 A1* | 6/2007 | Walker | ................... | G06Q 50/10 |
| | | | | 705/321 |
| 2008/0016054 A1* | 1/2008 | Liska | ...................... | G06Q 10/10 |
| 2010/0131418 A1* | 5/2010 | McCagg | ................ | G06Q 10/00 |
| | | | | 705/321 |
| 2011/0099202 A1* | 4/2011 | Dedeoglu | ............ | G06F 21/6254 |
| | | | | 707/780 |
| 2011/0113049 A1* | 5/2011 | Davis | .................. | G06F 21/6254 |
| | | | | 707/757 |
| 2011/0158252 A1* | 6/2011 | Birdsall | .................. | H04L 51/16 |
| | | | | 370/417 |
| 2012/0030126 A1* | 2/2012 | McCagg | ................ | G06Q 10/00 |
| | | | | 705/321 |
| 2012/0084120 A1* | 4/2012 | Hirsch | ............... | G06Q 30/0203 |
| | | | | 705/7.32 |
| 2012/0170726 A1* | 7/2012 | Schwartz | ................ | H04M 3/56 |
| | | | | 379/93.02 |
| 2013/0290205 A1* | 10/2013 | Bonmassar | ........ | G06Q 10/1053 |
| | | | | 705/321 |
| 2014/0006553 A1* | 1/2014 | Dambayashi | ........... | H04L 67/10 |
| | | | | 709/217 |
| 2014/0047551 A1* | 2/2014 | Nagasundaram | ..... | G06F 21/606 |
| | | | | 726/26 |
| 2015/0006422 A1* | 1/2015 | Carter | ................ | G06Q 10/1053 |
| | | | | 705/321 |
| 2015/0339631 A1* | 11/2015 | Hodges | .............. | G06Q 10/1053 |
| | | | | 705/319 |

OTHER PUBLICATIONS

Alexandra Chang, Apr. 15, 2013, The Most Important LinkedIn Page You've Never Seen https://www.wired.com/2013/04/the-real-reason-you-should-care-about-linkedin/.*

* cited by examiner

HOSTED SERVER SYSTEM AND METHOD FOR INTERMEDIATING ANONYMOUS FIRM MATCHING AND EXIT STRATEGY NEGOTIATIONS

CROSS-REFERENCES TO RELATED APPLICATIONS

This application claims benefit of U.S. Provisional Patent Application No. 62/385,382, filed Sep. 9, 2016, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to facilitating the combination of business entities. More particularly, the present invention relates to hosted server systems and methods for intermediating anonymous firm matching and exit strategy negotiations.

This process addresses a common problem in today's business environment. Because of changing demographics, particularly the aging of practitioners in various industries, there is a need for firms to develop exit strategies, to merge and to buy and sell. As fewer people are available to serve clients and customers, the combination of firms has developed into a method to continue to serve these needs more efficiently.

However, there is currently reluctance among these business owners to announce their desire to combine with another firm for fear of losing customers and clients as well as employees. Once a firm has indicated their willingness to be acquired or to sell, clients and employees with loyalties to the business owners begin looking for other situations.

BRIEF SUMMARY OF THE INVENTION

In accordance with exemplary systems and methods as disclosed herein, practitioners may remain anonymous while actively pursuing business combinations with other firms in their industry. A system of anonymized disclosure and matching of key business factors allows practitioners to determine anonymously potential business combination options. Once a match has been made and a potential merger is being considered, a series of anonymized but progressive disclosures allows the practitioners to securely share relevant information about their businesses to the matched party without fear of disclosure of identity. By utilizing the process, the practitioner is allowed to capture the value of his business while providing a more seamless transition for their clients and customers and their employees.

In a particular embodiment as disclosed herein, a hosted server-implemented method for intermediating anonymous firm matching and exit strategy negotiations begins by generating, for each of a plurality of client users, a user account in response to user interaction with a hosted server interface. An exemplary such user account may include a unique identifier, selection criteria including an industry type, and non-selection criteria comprising one or more parameters which must be matched in order to consider selection of a corresponding client. The method further involves executing one or more selection algorithms to match a first client user with one or more of the remaining client users based on at least the selection criteria and the non-selection criteria, and electronically presenting the first client user with anonymized profiles corresponding to the one or more client users matched to the first client user. Responsive to selection by the first client user of one or more of the anonymized profiles, the method further includes generating a cooperative interface for confidential and anonymous sharing, among the first client user and the one or more client users corresponding to a respectively selected profile, of client user data corresponding to the selection criteria. Further responsive to authorization from each corresponding client user, the method includes generating intermediated and anonymous correspondence between the first client user and one or more of the one or more selected client users via a hosted server platform, wherein the hosted server interfaces substantially prevent identification of either client user participating in the intermediated correspondence.

In one aspect of the aforementioned embodiment, the method further enables the first client user to selectively initiate execution of one or more additional iterations of the selection algorithms based on one or more revisions to one or more of selection criteria and non-selection criteria.

In another aspect of the aforementioned embodiment, the intermediated and anonymous correspondence between client users may comprise an iterative addition of shared profile information for successively authorized rounds of correspondence.

In another aspect of the aforementioned embodiment, the method further generates a dynamic questionnaire corresponding to each of the client users in a given intermediated and anonymous correspondence, wherein the iteratively provided profile information corresponds to answers provided by respective client users with respect to the dynamic questionnaire.

In another aspect of the aforementioned embodiment, the method selectively enables an open communication platform between respective client users in place of the intermediated and anonymous correspondence after completion of a threshold level of profile information sharing.

In another aspect of the aforementioned embodiment, the open communication platform between the respective client users may be selectively fast-tracked prior to completion of the threshold level of profile information sharing, responsive to mutual agreement of the respective client users.

In another aspect of the aforementioned embodiment, the hosted server interfaces may substantially prevent identification of either client user participating in the intermediated correspondence at least in part by identifying an anonymity risk for certain profile information corresponding to a certain round of correspondence, and denying entry thereof by either of the one or more client users.

In one alternative or supplemental embodiment, the hosted server interface may mask said identified profile information when provided in correspondence by either of the one or more client users.

In another alternative or supplemental embodiment, the hosted server interface may substitute broader profile information or a broader range of profile information in place of such identified profile information when provided in correspondence by either of the one or more client users.

DETAILED DESCRIPTION OF THE INVENTION

Figure 1:
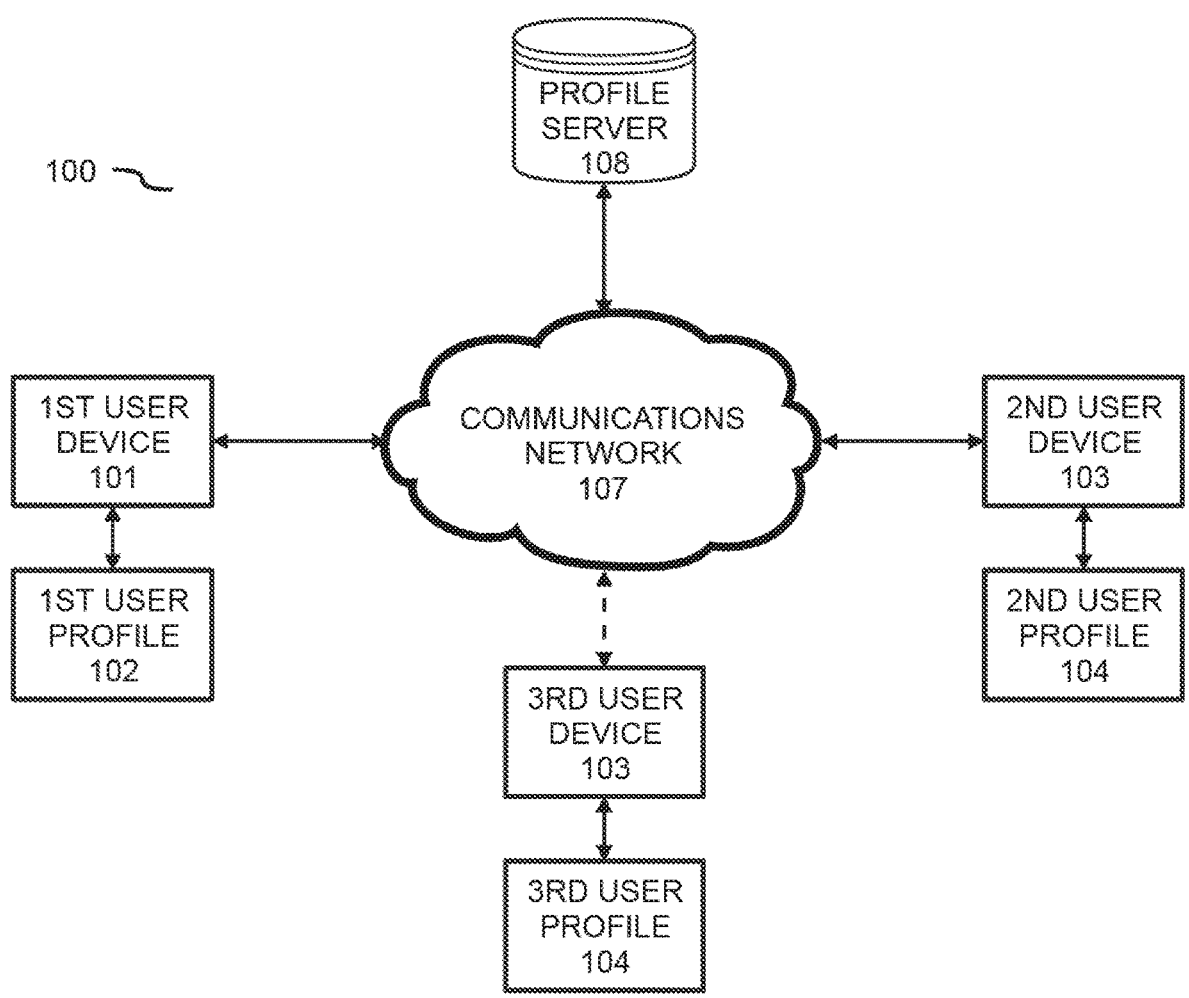
FIG. 1 is a block diagram representing an exemplary embodiment of a system for intermediating anonymous firm matching and exit strategy negotiations as disclosed herein.

A system and method of an invention as disclosed herein may relate to a website that matches businesses that are entertaining the possibility of combining their operations (through merger or acquisition) based upon various business factors and the intent of management. All parties may remain anonymous until they are comfortable sharing sufficient identifying information and choose to share that information.

The business factors to match may typically include, but are not expressly limited to: industry; location; type of combination desired (merger, acquisition, planning for owner retirement, etc.); size of operations; financial performance; customer demographics; product offering; management style; technology; pricing; and human resource policies and benefits.

Referring generally to FIGS. 1-11, various exemplary embodiments of an invention may now be described in detail. Where the various figures may describe embodiments sharing various common elements and features with other embodiments, similar elements and features may be given the same reference numerals, and redundant description thereof may be omitted below.

Referring first to FIG. 1, an exemplary embodiment of a system 100 for intermediating anonymous firm matching and exit strategy negotiations as disclosed herein may include a first user device 101 associated with a specific user and a first user profile 102 comprised of various profile factors in relation to the first user. The first user device 101 may be connected to a communications network 107 to which a profile server 108 and at least a second user device 103, associated with a second user and second user profile 104, are attached. In an embodiment a plurality of user devices and profile servers may be contemplated within the system 100 beyond the first and second user profiles 102 and 104; e.g. third user device 105 and third user profile 106 provided here for illustrative and comparative purposes. User profiles may be stored in duplicate, in part, or in whole upon the profile server 108.

The first user via the first user device 101 may initiate an anonymous firm matching request, whereby a computer program matching algorithm references the first user profile 102 and determines from a plurality of user profiles on the profile server 108 one or more matching candidates. The computer program matching algorithm may in one embodiment be stored on the first user device 101, or in another embodiment on the profile server 108, or in yet another embodiment distributed amongst a plurality of computers communicatively connected via the communications network 107.

The matching algorithm may rank matching candidates in order of best fit to user-specified or system-determined criteria. In an embodiment, the system 100 may present one or more matching candidates' user profiles based upon best fit to the first user profile 102.

In a further embodiment, the system 100 may present only a portion of the matching candidates' user profiles in such a way that the matching candidate user profile is anonymized and, from the perspective of the first user, disassociated with the matched user. For example, the first user profile 102 may be best matched with the second user profile 104 over the third user profile 106 pursuant to selected criteria and ranked factors; in such an instance, in one embodiment the first user may only be presented with the second user profile 104 or, in another embodiment, may be presented with the second user profile 104 ranked higher as a match than the third user profile 106; but in neither instance would the first user be able to determine directly the identity of the second and third user based in their user profiles as presented to the first user.

The first user may elect to open a factor sharing channel with one or more of the matched candidates, whereby the system 100 will enable additional sharing of profile information not disclosed in the initial matching process. For example, in an embodiment wherein the first user and second user are matched, and the first user initiates factor sharing with the second user, the first user may select a limited number of profile factors to request in association with the second user. The system 100 may query the second user for an equivalent number of profile factors in association with the first user and in which the second user is interested, determine the relevant requested profile factors from the first and second user profile, and then present the first and second user with each other's profile information as requested, respectively, on the first user device 101 and second user device 103.

In an embodiment, this process may be performed iteratively, whereby an increasing number of profile factors may be disclosed about the other party in various request rounds.

In various embodiments, the factor sharing may be performed with multiple matched users simultaneously; for example, if the first user matched with the second and third user, profile sharing rounds may be conducted independently between the first user and second user and the first user and third user.

In various embodiments, the first user may initiate a question-and-answer session with a matched candidate whereby the first user selects a number of questions to ask the matched user and must also respond to an equivalent number of questions asked by the second user.

In an embodiment, the questions may be selected from a bank of multiple choice questions and associated answers. In another embodiment, the questions may be open-ended and selected from a bank of questions or crafted specifically by the user.

The system 100 may further permit the first user to initiate open communication with the second user over the communications network 107 and via the first and second user devices 101 and 103.

In an embodiment, the open communication process may be delayed until a sufficient number of preceding profile factor sharing and/or question asking rounds have been completed.

In another embodiment, the system 100 may permit the first and second users to engage directly in open communication upon their mutual agreement to do so.

The system 100 may enable the first and second users to request finding a facilitator for merging the users' associated companies. The facilitator may have a facilitator profile 109 stored upon the profile server 108.

In one embodiment, the first and second users may select a facilitator from a list of facilitator profiles 109.

In another embodiment, the system 100 may select the facilitator based upon a comparison of user profile factors for the first and second user profiles 102 and 104, and profile factors for the facilitator profile 109.

Figure 2:
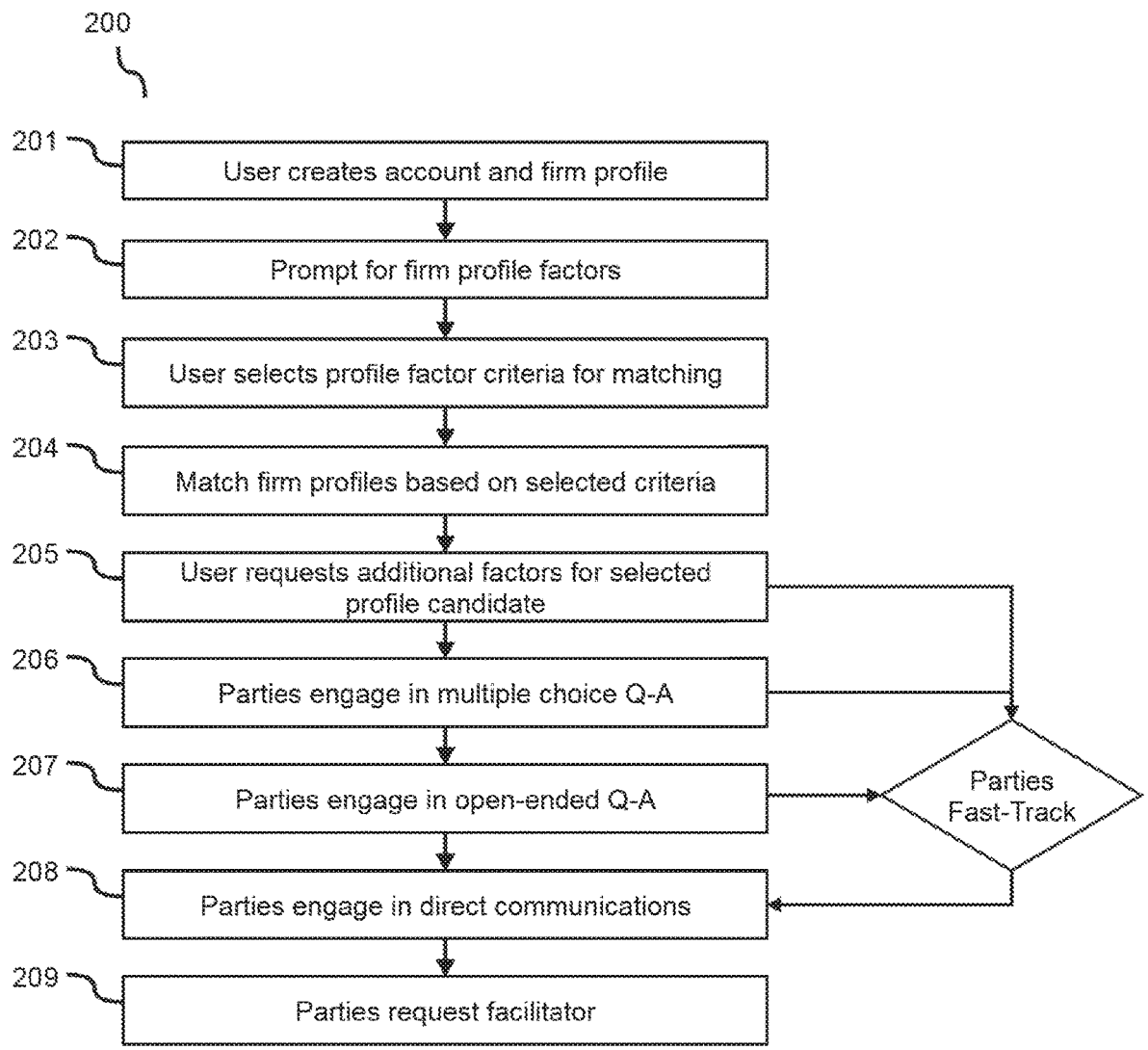
FIG. 2 is a flowchart representing an exemplary embodiment of an overview process for intermediating anonymous firm matching and exit strategy negotiations as disclosed herein.

Referring to FIG. 2, an exemplary method 200 as disclosed herein for intermediating anonymous firm matching and exit strategy negotiations as disclosed herein may be described in part or in whole as follows. The method 200 may begin at a first step 201 wherein a user creates an account and a firm profile associated with that account. The account may comprise a username, password, and profile settings, and in an embodiment the account may comprise multiple usernames and passwords. In another embodiment, multiple accounts may have access to the same firm profile, such as when multiple accounts are registered using the same company's domain. In an embodiment, the user may optionally enter the firm profile name though may not be required to do so. In various embodiments, the account may only be identifiable based upon a unique firm profile ID, such as a serial number or non-duplicative, randomly generated code.

In step 202, the system prompts the user to enter firm profile factors pertaining to firm information relevant to the business combination process. Profile factors may include, but are not necessarily limited to: industry, location, type of combination desired, size of operations, financial performance metrics, customer demographics, types of products or services offered, management style, technology implicated, pricing, and HR policies and benefits. Other factors which may be of interest to other businesses pursuing a business combination may be included, as well as sub-factors. For example, type of combination desired may be selected from a list of merger, acquisition, and practice continuation; size of operations may include sub-factors such as annual volume of business, number of employees, and number of offices; financial performance metrics may include key performance indicators such as profit per owner, billed hours per partner, billed hours per employee, leverage, revenue percentage by type; customer demographics may include average size by revenue, percentage revenue by industry, top-five clients' annual revenue; etc.

In some embodiments, the system may identify profile factors for which a combination thereof may de-anonymize a firm. The system may enforce anonymity in a security step by refusing to store certain inputted profile factors, by masking said profile factors from other users during the performance of method 200, by substituting a broader range of information, and so forth. For example, the system may determine that, for a given input of profile information, only a small range of companies (e.g. 1-5) would match that description, significantly affecting the anonymity of the user's firm; the system may perform anonymization steps by broadening the range of those inputs, such as broadening the range of firm size from "175 employees" to 20-200 "employees," thereby increasing the pool of comparable firms to a sufficient quantity to preserve reasonable anonymity. In an embodiment, the system may further provide a warning to the user that certain information reduces anonymity and may allow the user to specify whether to broaden or mask the information or perform said anonymizing steps.

In step 203, the user may select a limited number of profile factors to match against the user's own profile. For example, a user may select up to five factors and input specific criteria limitations for said factors to be used in a firm profile search for potential combination candidates. In certain embodiments, the system may automatically limit industry type to those which match or substantially match with the user's specified profile industry. In some embodiments, the user may specify a level of importance for each profile. This importance level may be relative to other profiles selected or absolute. For example, the user may be able to designate whether one or more specific profile factors are "deal breakers," whereby a candidate's profile information much match exactly to the specified criterion or range in order to be considered. Comparatively, lower-ranked factors may permit the system to provide candidate matches who are further outside of the specified criteria or ranges.

In certain embodiments, the system may determine on behalf of the user certain profile factors and suggest, or alternatively dictate, to the user certain profile factors or rankings thereof. For example, where profile factors and rankings would result in no, or few matches, the system may alert the user that the profile criteria will not generate a substantial pool of candidates and recommend the factor ranges or rankings of factors be broadened to permit greater matches. In a further embodiment, the system may compare the user's profile factor selections against the user's firm profile and determine therefrom if the selections are reasonable and likely to generate a sufficient pool of candidate matches. For example, the system may warn a user whose profile factors suggest the firm's low financial performance that selection of profile criteria for candidates with high financial performance may not yield favorable matches, i.e. that firms meeting the user's criteria will not be interested in the user's selected criteria, and so it is unlikely that a query will result in candidate matches. The system may limit the user from selecting said criteria or may otherwise provide warning.

In step 204, the system may match the user's selected criteria with other users' firm profiles and profile information thereof based upon the first user's selections and rankings, and then present the matched firm profiles as match candidates. For example, the system may initially determine a set of matched firm profiles based upon a user's "deal breaker" selections, returning only the results which meet the exact definition for that deal breaker factor; the system may then rank the resulting set of candidates by weighted relatedness to the other factors, such that firms matching closely to factors designated with higher performance will appear first in the list of returned candidates. In one embodiment, this weighted ranking system may be performed in accordance with a weighted multiplier algorithm based upon the number of criteria selected. For example, for four criteria selected, the system may first determine a relative deviation score for each criterion, then may multiply each deviation score by a ranking multiplier. In said example, with four criteria selected, the most important criterion would have its deviation score multiplied by one, the second most important would have its deviation score multiplied by two, the third most important by three, and the fourth by four, whereby higher summated deviation scores would be ranked lower as matches. In an alternative example, the rankings may be scored positively wherein closer matches are scored higher than more distant matches.

The system may return only the profile factors for a matched candidate profile that were selected as matching criteria. The system will not return further information about the matched candidate's profile during this step. In an embodiment, this step may be performed periodically and as scheduled by the system or by the user, wherein alerts may be generated for new matches appearing matching a user's selected criteria, such as when new firm profiles are added to the system that match or when existing profiles are updated with new firm profile information. For example, the system may send an alert whenever a new match is determined, or may send out a weekly email summary of potential matches.

In step 205, the user may select one of the matched candidates as an interested party for potential combination, and the system would prompt the user to specify and request a limited number of additional profiles factors of interest to the user and to be provided by the selected candidate. Upon selecting the additional profile factors, the system sends a request to the selected candidate to provide a similar number of requested profile factors of interest to the selected candidate's user. When both parties have provided their respective selections, the system confidentially discloses to each user their requested selections, providing the profile information stored on the system for each candidate to the other. In certain embodiments, the system may not disclose to anyone but the user providing the requested criteria the information disclosed about the respective party. Step 205 may be repeated until the user or the selected matched candidate opts to continue the process, whereby the method continues in step 206, or opts to discontinue the process, whereby method 200 terminates. In an embodiment, the system may permit either user to request a direct communications channel, whereby the method is "fast tracked," bypassing the intermediate disclosure steps 206 and 207, and continuing in step 208, further described below.

The method 200 may continue to step 206 when one user elects to engage in a multiple-choice question-and-answer phase and the other user accepts. In an embodiment, one user may select from a bank of multiple choice questions stored on the system a limited number of questions to ask the other matched user, and the system may provide said questions with multiple choice answers to the other user. The receiving user may then select answers to those questions and further select a similar number of questions to be answered by the first user. The system then provides the first user with those questions for the first user to answer. When both users have selected their respective questions and answers, the system discloses to both users the other user's answers. In an embodiment, the user may be permitted to craft one or more of his or her own multiple-choice questions and answers in addition to or in alternative to selecting said questions from a predetermined bank.

Step 206 may be repeated until the user or the selected matched candidate opts to continue the process, whereby the method continues in step 207, or opts to discontinue the process, whereby method 200 terminates. In an embodiment, the system may permit either user to request a direct communications channel, whereby the method is "fast tracked," bypassing the intermediate disclosure steps 207 and continuing in step 208.

The method 200 may continue to step 207 when one user elects to engage in an open-ended question-and-answer phase and the other user accepts. In said step, the first user may select, or alternatively craft, a limited number of questions for the other user to answer. The prompt and answer may in some embodiments be limited to a certain word count or character count. Similar to steps 205 and 206, the system will provide the second user with the first user's question or questions to answer and prompt the second user for a similar number of prompts to be answered by the first user, wherein answers are not disclosed to either user until both users have submitted their respective answers. In an embodiment, the system may not provide the second user with the first user's prompt until the second user has provided his or her own prompt.

Step 207 may be repeated until the user or the selected matched candidate opts to continue the process, whereby the method continues in step 208, or opts to discontinue the process, whereby method 200 terminates.

The method 200 may continue in step 208 when one user elects to engage in an open communications session and the other user accepts. In said step, the system may permit the users to engage in real-time, direct communication via a secure channel within the system. The system may ensure confidentiality by only disclosing the unique IDs to each user. In an embodiment, the system may also actively intercept information that would compromise a user's identity and censor said information, such as e-mail addresses, phone numbers, names, etc.

In step 209, the users may collectively select an option to find a facilitator who can assist with the combination process, whereby the system may provide both users with a list of available facilitators as stored upon the system. The users may be able to select preferred facilitators, and the system may continuously narrow the list until one or more preferred facilitators as selected by both of the users are presented to each user. In an embodiment, the system may provide a ranking of facilitators based upon certain criteria such as each user's profile information. For example, certain facilitators familiar with large business mergers may be ranked higher for users with firm profiles suggesting large businesses interested in merger. Others may be ranked in accordance with use-specified preferences, such as cost, geographical proximity, etc. Said ranking may be influenced by additional factors such as paid advertising placement, percentage fee collected, etc.

The system may optionally enable communications between the facilitator and the users, whereby the combination or merge process may begin, and the firm identities and external communications profiles such may be disclosed. In certain embodiments, the system may provide an ongoing process for ensuring due diligence, allowing the users and/or facilitator to specify whether a merger has been abandoned or completed in accordance with the due diligence requirements. The users may accordingly update their account information pursuant to the combination, such as by closing one account and changing the firm profile factors of the other account.

FIGS. 3-11 are block diagrams referring to an exemplary method of for intermediating anonymous firm matching and exit strategy negotiations as disclosed herein. FIGS. 3-11 may be interpreted in accordance with method 200, each figure representing the whole or part of an individualized step in accordance with the phases described therein. FIGS. 4-11 may be further interpreted in accordance with FIG. 3, wherein each phase step represents a block process and/or decision method.

Figure 3:
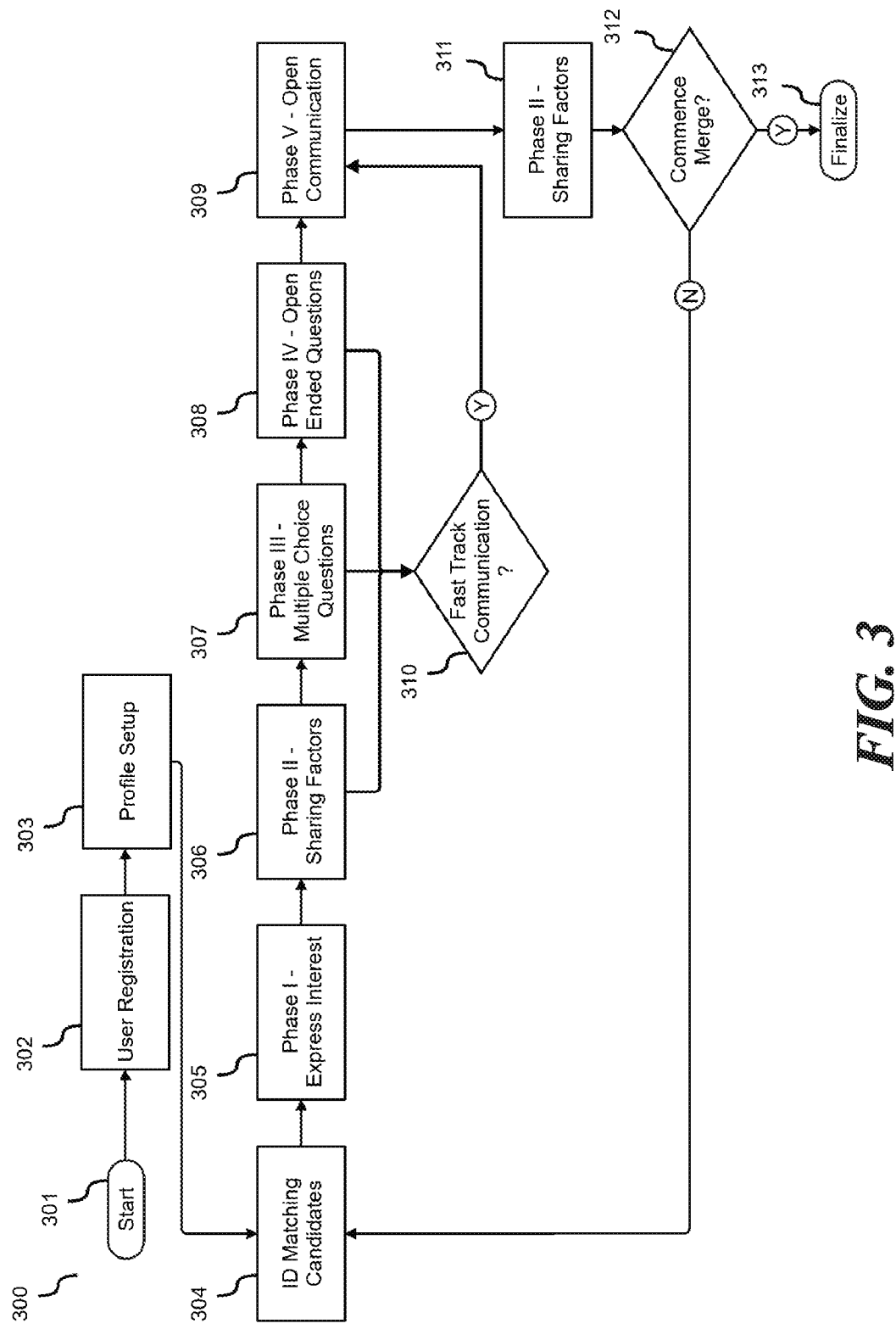
FIG. 3 is a flowchart representing another exemplary embodiment of an overview process for intermediating anonymous firm matching and exit strategy negotiations as disclosed herein.

Referring to FIG. 3, a flowchart representing another exemplary embodiment of an overview process for intermediating anonymous firm matching and exit strategy negotiations as disclosed herein may be described in part or in whole as follows. A method 300 is initiated in accordance with a user's direction at a starting step 301. The user is directed through a user registration process 302 for setting up a user account and collecting firm information and billing information. The registration process 302 may be further described in various embodiments in accordance with method 400 as described herein. Upon completion of the user registration process 302, the user is directed to a profile setup process 303 for specifying matching factors and criteria for the user's associated firm. The profile setup process 303 may be further described in various embodiments in accordance with method 500 as described herein.

When the user completes the registration and profile setup process of steps 302 and 303, the user may begin one or more iterations of the candidate matching process, generally described as steps 304-309. The process begins in step 304 when the system flags or otherwise specifies the user account as primed for matching and initiates a search of other user profiles and firms for determination of one or more potential matches for merger based on each user's specified criteria. The system may in various embodiments automatically select the best match based on matching algorithms for determining the highest likelihood of match success ultimately resulting in a successful merger. In one such embodiment, the system may employ machine learning algorithms based on prior iterations of method 300 to adjust the search and suggestion or selection of potential matches based upon criteria matches or other factors that have trended more successfully. For example, the system may change the weights of certain criteria matches based upon the determined importance of the criteria for ensuring a successful match and merger. In various embodiments, the system may present the user with more than one match suggestion for user selection before proceeding.

In an embodiment, should either user specify no interest in proceeding with a match throughout steps 305-309, the system may return to step 304 to begin a new iteration of the process to match an initiating user with a new potential merger match.

The method 300 continues in a first phase whereby two users of two different firms specify a mutual interest in investigating a potential merger with each other (step 305). Phase I (step 303) may be further described in various embodiments in accordance with method 600 as described herein. In one embodiment, the system may perform "blind matching" wherein both users must specify an interest in a potential merger with one another without being made aware of the other's interest until such mutual interest has been specified. In an alternative embodiment, the initiating user may specify an interest, wherein the system sends a message to the other user indicating the initiating user's interest and permitting the user to affirm or deny proceeding with the process.

Should both users express an interest, the method 300 proceeds to Phase II (step 306) for users' mutual sharing of firm profile factors relevant to the potential merger. Phase II (step 306) may be further described in various embodiments in accordance with method 700 as described herein. In various embodiments, step 306 may be iterative and turn-based, such that the initiating user may select a limited series of factors to reveal and submit to the second user, after which the second user may select a similarly limited series of factors to reveal to the initiating user, occurring in repeated rounds. In an embodiment, the initiating user and second user may be required to reveal the same factors, whereas in an alternative embodiment, the initiating user and second user may be free to select different factors to reveal.

Upon successful completion of Phase II (step 306), the method 300 continues to Phase III (step 307), wherein the users select multiple-choice questions to present to one another and answer, respectively. Phase III (step 307) may be further described in various embodiments in accordance with method 800 as described herein. In various embodiments, step 307 may be iterative and turn-based, such that the initiating user may select a limited series of multiple-choice questions to present to the second user to answer, after which the second user may answer the questions and then select a similarly limited series of questions to posit to the initiating user, occurring in repeated rounds. In an embodiment, the initiating user may be required to answer the same questions the initiating user selects to ask the second user, wherein the system will reveal the initiating user's answer after the second user provides their own answer to the initiating user. In an embodiment, the multiple-choice questions may be selected from a bank of preconstructed questions, whereas in an alternative embodiment, one or more multiple-choice questions may be created by the user in accordance with system-specified rules for question construction.

Upon successful completion of Phase III (step 307), the method 300 continues to Phase IV (step 308), wherein the users select a series of open-ended questions to present to one another and answer, respectively. Phase IV (step 308) may be further described in various embodiments in accordance with method 900 as described herein. In various embodiments, step 308 may be iterative and turn-based, such that the initiating user may select a limited series of open-ended questions to present to the second user to answer, after which the second user may answer the questions and then select a similarly limited series of questions to posit to the initiating user, occurring in repeated rounds. In an embodiment, the initiating user may be required to answer the same questions the initiating user selects to ask the second user, wherein the system will reveal the initiating user's answer after the second user provides their own answer to the initiating user. In an embodiment, the open-ended questions may be selected from a bank of preconstructed questions, whereas in an alternative embodiment, one or more open-ended questions may be created by the user in accordance with system-specified rules for question construction.

In an embodiment, at any time during steps 306-308, the users my mutually elect to "Fast Track Communication" (step 310), bypassing the incremental completion of the remainder of steps 306-308 and beginning immediately thereafter with Phase V (step 309). The Fast Track Communication process (step 310) may be further described in various embodiments in accordance with method 1100 as described herein.

Alternatively, upon successful completion of Phase IV (step 308), the method 300 continues to Phase V (step 309) wherein the users may engage in open communication with one another. Phase V (step 309) may be further described in various embodiments in accordance with method 1000 as described herein. In one embodiment, the system may provide one or more internal communication methods such as instant or direct messaging. In another embodiment, the system may disclose contact information for external communications, such as phone numbers or email to permit extra-system communication between the users.

In one embodiment, one of the users may optionally select to engage a facilitator to assist with the merging process, thereby initiating a facilitator selection process (step 311). Step 311 may be further described in various embodiments in accordance with method 1000 as described herein, particularly with respect to steps 1008-1010. The facilitator selection process (step 311) permits a user to select a relevant facilitator to assist with the merger process and provides contact information for the user to engage said facilitator.

Upon selection of a facilitator or, optionally, upon foregoing the engagement of a facilitator, the parties may select to commence or abandon the merger (step 312). Should either user abandon the merger, the process 300 may begin in a new iteration at step 304. Should both users agree to commence the merger, then the system may provide relevant information to the parties and, in respective embodiments, to an engaged facilitator, to commence the merger. Upon finalization of the merger between the users' firms (step 313), the process 300 concludes.

Figure 4:
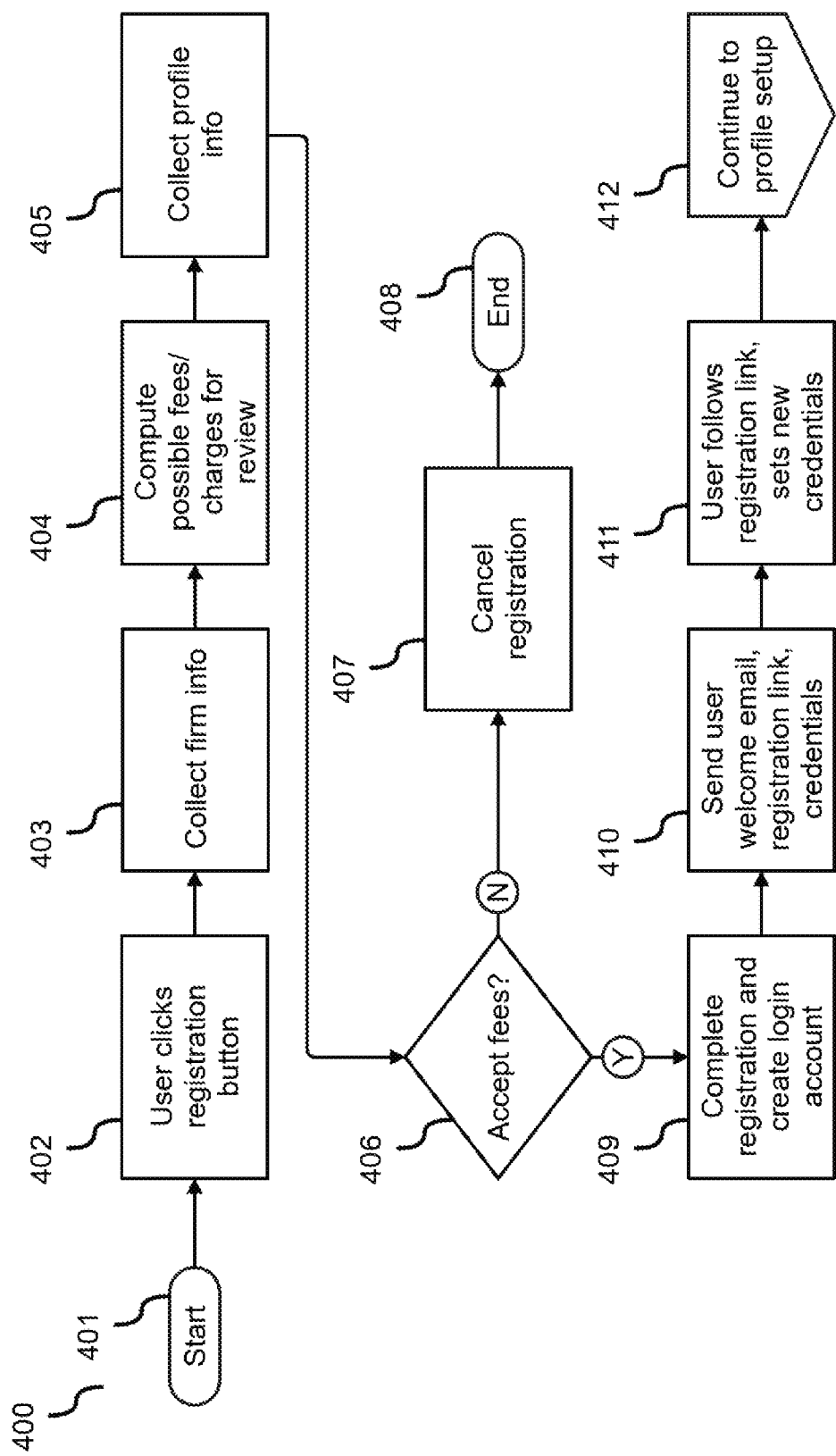
FIG. 4 is a flowchart describing an exemplary user registration process in accordance with the systems and methods disclosed herein.

FIG. 4 refers to an exemplary user registration process and may be described as follows. The process 400 starts at step 401 when a user accesses the system's user interface and then clicks on a provided user registration button (step 402). The system then intakes the user by requesting the user provide relevant firm information for the creation of firm profile matching factors (e.g. firm's annual gross revenue). The collected information may denote financial, demographic, geographic, and other business-based information relevant to various users who may be interested in the completion of a business merger. In an embodiment, the system may attempt to verify user-provided information based upon public records visible to the system. In another embodiment, the system may require the user to upload verification information such as tax documents, business registration documents, and the like.

In step 404, the system may compute any fees or charges to be levied upon the user for registration with and use of the system. In an embodiment, fees may be based upon the information provided in step 403. For example, the system may assess different fees for use for firms of different sizes, different revenues, etc.

In step 405, the system may prompt the user to input, or may otherwise collect from associated systems and accounts (e.g. a linked LinkedIn account), user profile information such as e-mail address, billing information, and the like. In step 406, the system may present the calculated fees to the user for verification and acceptance. If the user denies the fees, then the system cancels registration (step 407) and the process ends (step 408). In an embodiment, the system may retain the user-submitted information for a period of time, thereby allowing a user who initiates process 400 again to bypass steps 402-405 or otherwise abbreviate said steps by presenting the previously inputted information for user verification.

If the user accepts the fees, then the system will complete the registration request and create a login account for the user (step 409). The system may further send the user a welcome email containing the user's login credentials and a hyperlink to confirm creation of the account (step 410). In an embodiment, the credentials provided may be automatically generated by the system, such as the creation of a temporary user password. In said embodiment, when the user follows the registration link (step 411) contained in the registration email, the user may then be able to specify new credentials such as email address, user name, and password.

The system may then continue to a profile setup process (step 412), which may in various embodiments be described in accordance with method 500 described below.

Figure 5:
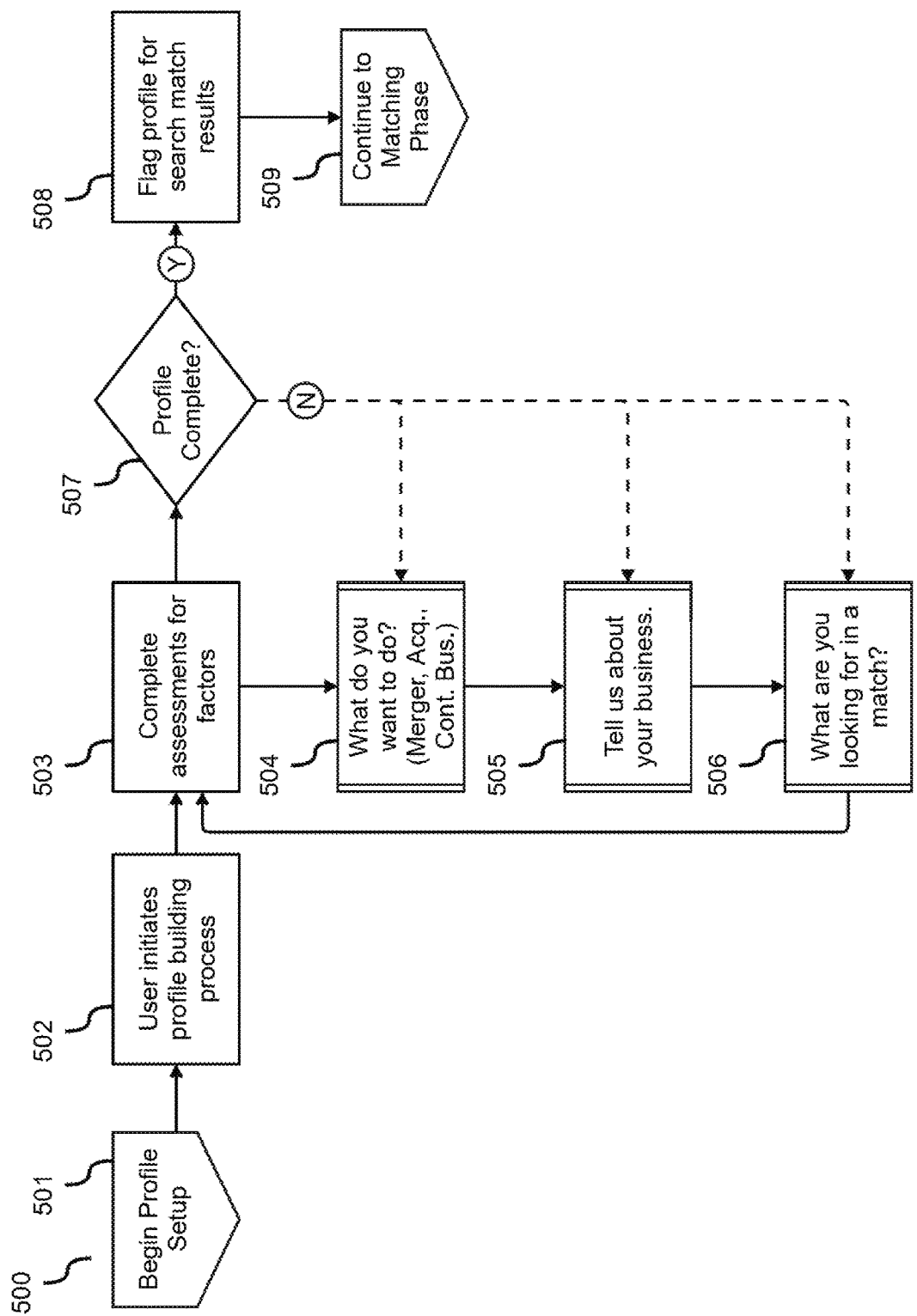
FIG. 5 is a flowchart describing an exemplary user profile setup process in accordance with the systems and methods disclosed herein.

FIG. 5 refers to an exemplary profile setup process and may be described as follows. The profile setup process 500 may begin at step 501 continuing from a previously completed user registration process, permitting only registered users to set up a profile. The user may initiate the process of building his or her profile in step 502 by logging into the account and submitting user and firm information not collected during the user registration process. The system may require the completion of assessments for various firm profile factors used in the firm matching process and request user input respective to these categories (step 503). For example, the system may require that the user provide information with respect to what kind of business entity relationship process they are seeking (e.g. merger, acquisition) (step 504), request additional business- or firm-specific information not required in the registration process (e.g. qualitative assessments or profile factors unrelated to billing) (step 505), or request factors of interest with respect to what the user requires or desires in a firm match (step 506).

The system may perform a periodic check to determine whether the user information provided is sufficient to proceed with a search and the matching process, thereby deeming the profile complete (step 507). In an embodiment, the user may be permitted to submit natural language responses to questions, wherein the system may utilize a natural language processing engine to determine a factor assessment therefrom. In said embodiment, the system may procedurally generate additional questions with respect to various categories or topics (e.g. steps 504-506) until the user has provided sufficient information to complete the profile (step 507).

Upon completion of the user profile, the system may flag the profile for inclusion among search match results (step 508), whereby other users may see the user's profile, a subset of information of the profile, or respective firm information therefrom, when requesting merger matches. Upon completion of the profile, the system may permit the user to continue to a matching phase for identifying prospective merger opportunities with other matched users (step 509).

Figure 6:
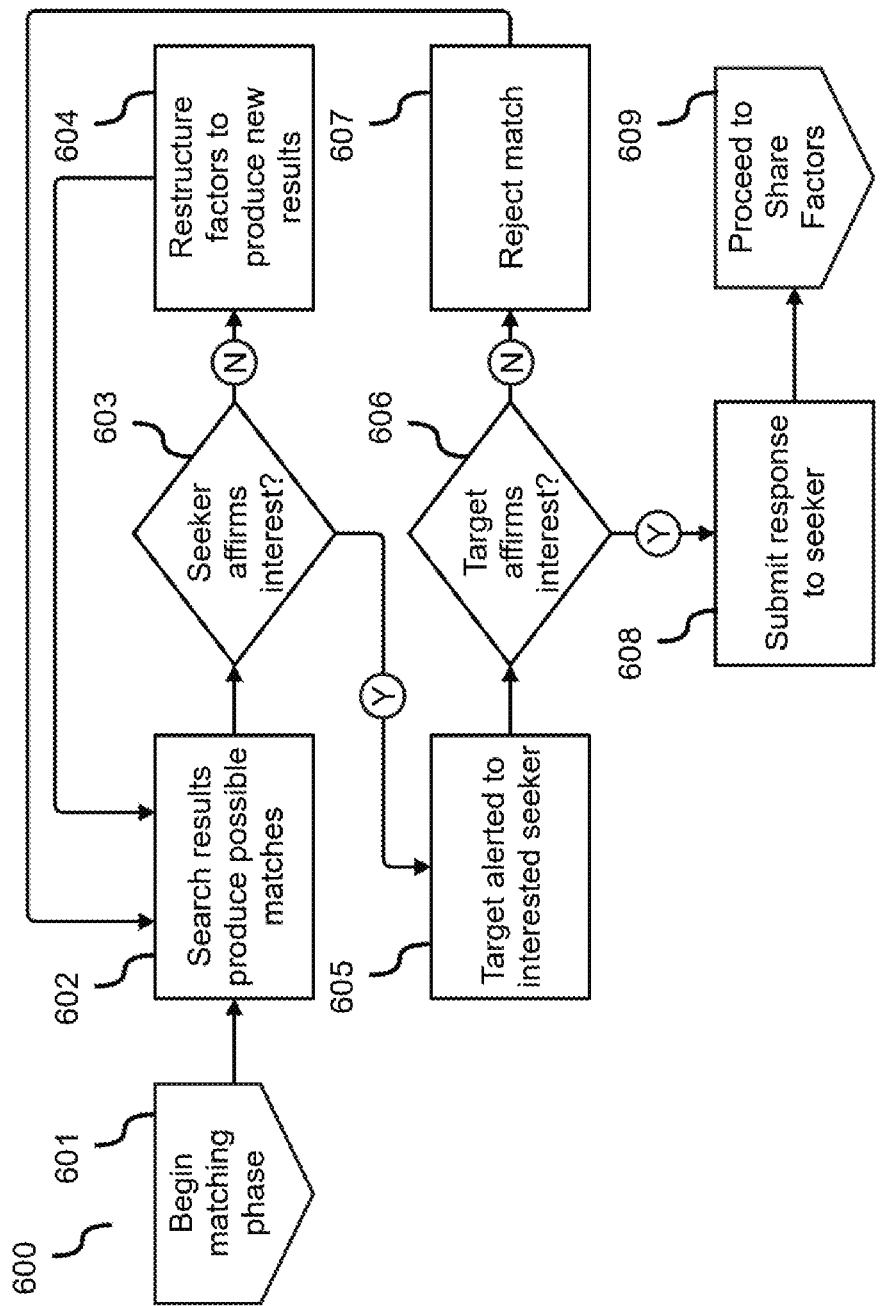
FIG. 6 is a flowchart describing an exemplary matching phase process for matching an interested user seeking merger match to a target user in accordance with the systems and methods disclosed herein.

FIG. 6 refers to an exemplary matching phase process and may be described as follows. The matching phase process 600 may begin at step 601 wherein a user initiates a search for potential matches. The system then searches other user profiles for firm information matching the criteria specified by the initiating user and produces a list of possible matches (step 602). In an embodiment, the system may select the closest match to the user-specified criteria and present that singular match to the user, whereas in alternative embodiments, the system may present the user a list of possible matches and a limited set of information thereupon, permitting the user to select from the list a potential match. The system may prompt the user to affirm interest in a provided match (step 603). If the user does not affirm interest in any provided matches, then the system may restructure the user factors to generate a new list. For example, the system may change the weight of importance of certain matched factors to generate a new list of matches. Alternatively, the system may prompt the user to change their input factors to widen the search parameters, such as, for example, requesting a broader spread of minimum and maximum requested factors, e.g. merger size, income, etc. The process may then repeat using the new search parameters and results in another iteration of method 600 at step 602.

If the user selects a potential match and affirms interest in that match, then the process continues at step 605 by sending a notification to the matched user that the matched user has an interested seeker. The system may further request the matched user ("target user" or "responding user") to affirm their interest in matching with the initiating user (step 606) and, in a respective embodiment, may provide a limited set of profile information for the initiating user to enable to the target user to weigh their potential interest in a merger. If the target user does not affirm interest, then the system notes that the match is rejected (step 607) and may reset the search process to step 602. In various embodiments, such as those that employ machine learning algorithms in the matching process, the system may adjust matching algorithms to better predict future match successes based upon the target denial. For example, the system may remove or downgrade suggesting the targeted user as a match for other users similar to the first initiating user.

If the target user affirms their interest in matching with the initiating user, then the system may generate an alert notifying the initiating user that the target user has affirmed their interest (step 608), thereby allowing the matching process to proceed to the next phase (step 609) (i.e. Phase II).

Figure 7:
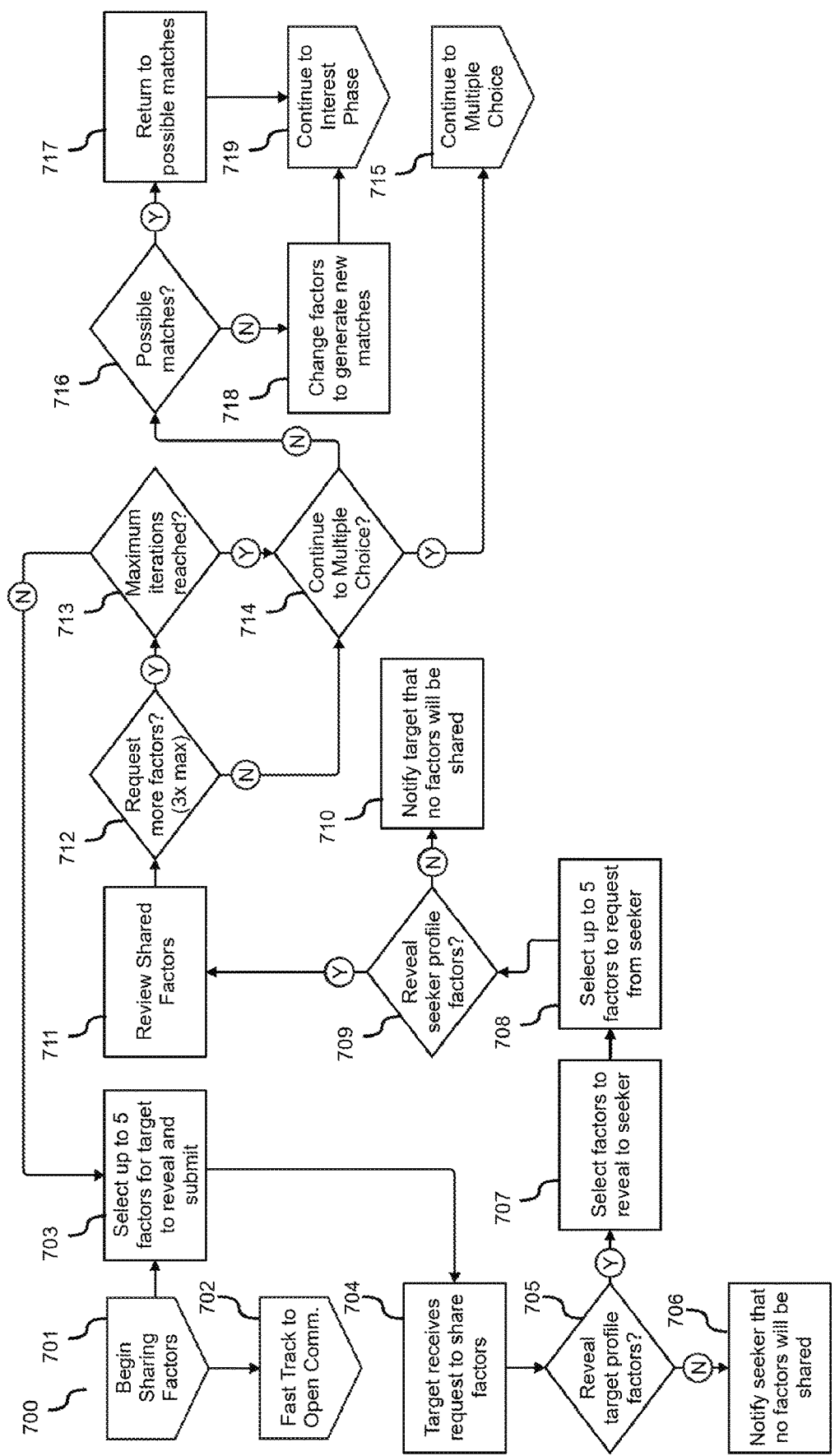
FIG. 7 is a flowchart describing an exemplary matching phase process for procedurally disclosing interest factors between the seeker user and target user in accordance with the systems and methods disclosed herein.

FIG. 7 refers to an exemplary process for sharing firm profile factors and may be described as follows. The sharing factors method 700 may begin at step 701 wherein the system has identified two users who have expressed interest in exploring a merger with one another and have not yet shared proprietary or system-screened information with one another. In an embodiment, users may at any time during method 700 mutually elect to "Fast Track" communications (step 702), bypassing the remainder of method 700 and subsequent iterative disclosure processes or methods and proceeding to an open communications process or method.

In step 703, the initiating user may select up to five firm profile factors from a list of available factors for the target user to reveal and may submit those firm profile factors to be submitted to the target. In step 704, the system alerts the target user to the initiating user's request for factor disclosure. The system then prompts the target user to complete, or otherwise authorize the disclosure of, the requested factors (step 705). If the target user does not authorize the disclosure of the requested factors, the system may then notify the initiating user ("seeker") that the factors will not be shared (step 706). In some embodiments, the target's refusal of disclosure may automatically terminate the match process. In other embodiments, the system may prompt the initiating user to select alternative factors or may request the initiating user confirm whether or not they wish to continue with a match without disclosure of the initially requested factors.

The target user may authorize the release of the requested factors (step 707). In an embodiment, the system may permit the target to authorize the release of some, but not all, requested target factors, and may further permit the target to select which factors to reveal. In step 708, the system may then permit the target user to select up to five firm profile factors to request from the seeker. In an embodiment, the target user may only be able to select up to the number of factors of which the target user authorized disclosure.

In step 709, The seeker may in turn determine whether to reveal the target's requested firm profile factors. In similar embodiments, the seeker may be permitted to select some of the factors to reveal. If the seeker rejects revelation of all factors, the system then notifies the target that the requested profile factors will not be shared (step 710). In one embodiment, the process may automatically terminate, whereas in other embodiments, the target may be presented the option of continuing without the requested firm profile factors and may be further permitted to select other firm profile factors to request from the seeker.

Should both parties agree to disclosure of all or the same number of factors in an iteration, the system then presents to each user the other user's firm profile factors authorized for disclosure (step 711). The system may then ask the initiating user whether the seeker would like to request additional factors in another disclosure iteration (step 712). In an embodiment, the system may also or alternatively prompt the target whether the target wishes to request from the seeker additional firm profile factors.

If the user requests the disclosure of additional firm profile factors, the system then determines if the users have reached the maximum limit of disclosure iterations (step 713). For example, the system may be configured to permit only three iterations of five factors per user. In an alternative embodiment, the system may permit the user to specify and agree upon the number of disclosure iterations permitted. If the users have remaining iterations, the system increases the iteration count by one and repeats steps 703-713. If the users do not have remaining iterations, or if the users do not request any additional factors to be disclosed, then the system proceeds to step 714 and prompts both users whether they would like to continue to the multiple-choice question phase. If both users accept the invitation to continue to the multiple-choice question phase, then the system proceeds to step 715 and initiates a process for iterative disclosure of multiple-choice questions and answers between the users (i.e. Phase III).

Alternatively, if either user denies the invitation to proceed, the system ends the matching process between the two present users and determines whether other matches exist for the initiating user's query profile (step 716). If additional matches exist, then the system returns the user to a presented list of the determined candidates for matching less the present target user (step 717) and, upon user selection of one of those remaining candidates, begins a new iteration of the interest phase (i.e. Phase I) (step 719). Alternatively, if no possible matches remain, the system may change, or may request the user to change, the initiating user's selected search query parameters to generate a new set of matched candidates (step 718), from which a new set of candidates may be determined and presented to the user to continue a new iteration of the interest phase (step 719).

Figure 8:
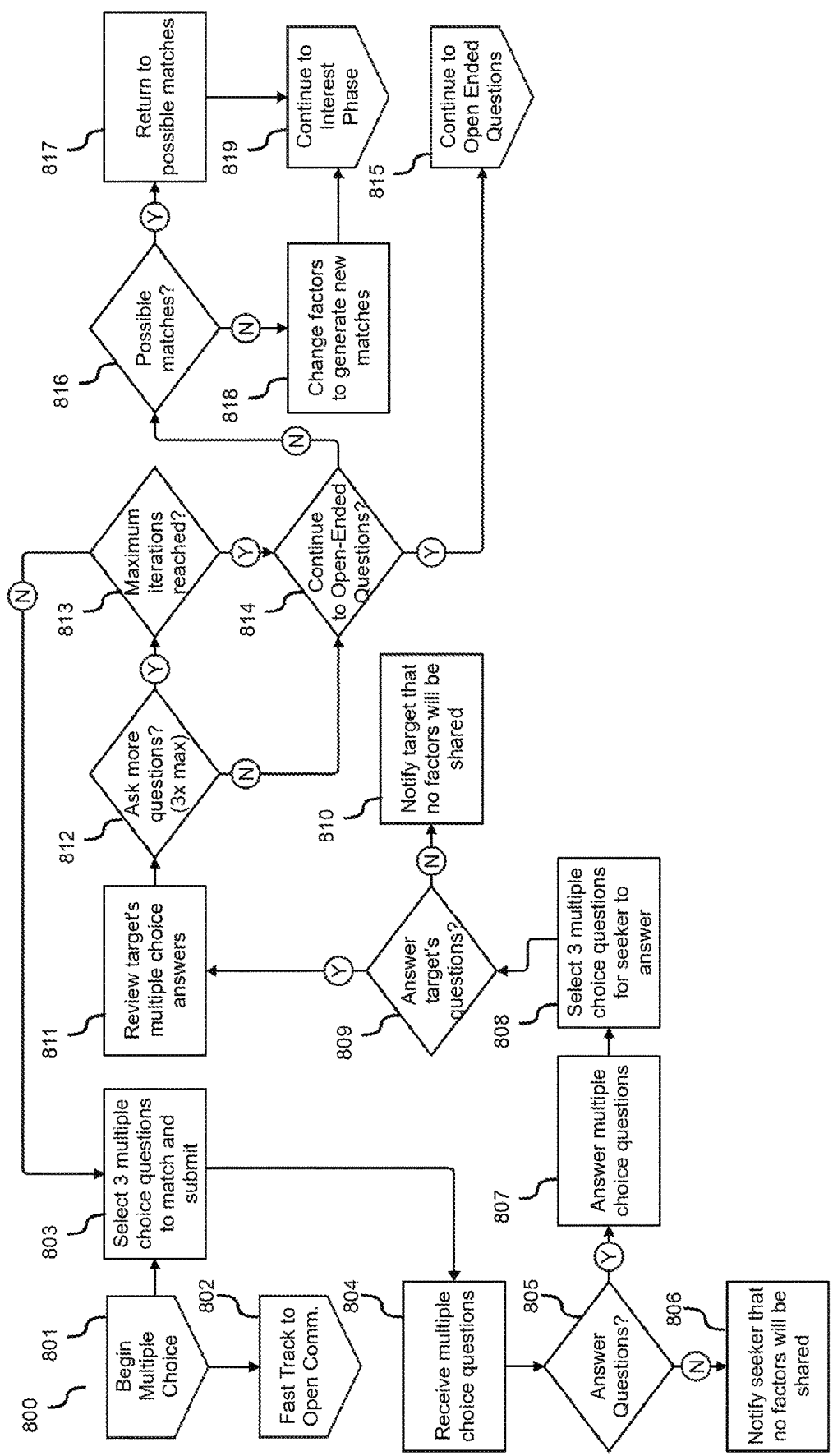
FIG. 8 is a flowchart describing an exemplary matching phase process for procedurally disclosing multiple choice questions, and answers thereto, between the seeker user and target user in accordance with the systems and methods disclosed herein.

FIG. 8 refers to an exemplary method for sharing multiple-choice questions and answers and may be described as follows. The multiple-choice method 800 may begin at step 801 wherein the system has identified two qualified, candidate-matched users who have expressed interest in requesting answers of multiple-choice questions from one another. In an embodiment, users may at any time during process 800 mutually elect to "Fast Track" communications (step 802), bypassing the remainder of method 800 and subsequent iterative disclosure processes and proceeding to an open communications process.

In step 803, the initiating user may select up to three multiple-choice questions from a list of available questions for the target user to answer and may submit those questions to be forwarded to the target. In an embodiment, the user may be permitted to craft his or her own multiple-choice questions within certain system-specified limits. For example, the system may permit the user to craft a 200-character question with five possible, user-crafted answers. In step 804, the system alerts the target user to the initiating user's submitted multiple-choice questions. The system then prompts the target user to select answers to the multiple-choice questions (step 805). If the target user refuses to answer the multiple-choice questions, the system may then notify the seeker that the target has refused to answer the questions (step 806). In some embodiments, the target's refusal to answer may automatically terminate the match process. In other embodiments, the system may prompt the initiating user to select alternative questions or may request the initiating user confirm whether or not they wish to continue with the process without answers to the originally submitted questions.

The target user may answer the provided multiple-choice questions (step 807). In an embodiment, the system may permit the target to choose to answer some, but not all, of the user-submitted questions, and may further permit the target to select which questions to answer. In step 808, the system may then permit the target user to select up to three multiple-choice questions for the seeker to answer. In an embodiment, the target user may only be able to select up to the number of questions of which the target user answered.

In step 809, The seeker may in turn determine whether to select answers to the target's submitted questions. In similar embodiments, the seeker may be permitted to select some of the questions to answer. If the seeker rejects answering all questions, the system then notifies the target that the submitted questions will not be answered (step 810). In one embodiment, the matching process may automatically terminate in the event that no questions are answered, whereas in other embodiments, the target may be presented the option of continuing without the requested answers and may be further permitted to select other multiple-choice questions to submit to the seeker.

Should both parties agree to disclosure of all or the same number of questions and answers in an iteration, the system then presents to each user the other user's answers to respectively submitted questions (step 811). The system may then ask the initiating user whether the seeker would like to submit additional questions in another disclosure iteration (step 812). In an embodiment, the system may also or alternatively prompt the target whether the target wishes to submit additional multiple-choice questions to the seeker.

If the user requests the submission of additional multiple-choice questions, the system then determines if the users have reached the maximum limit of disclosure iterations (step 813). For example, the system may be configured to permit only three iterations of three multiple-choice questions per user. In an alternative embodiment, the system may permit the user to specify and agree upon the number of disclosure iterations permitted. If the users have remaining iterations, the system increases the iteration count by one and repeats steps 803-813. If the users do not have remaining iterations, or if the users do not submit any additional questions to be answered, then the system proceeds to step 814 and prompts both users whether they would like to continue to the open-ended question phase. If both users accept the invitation to continue to the open-ended question phase, then the system proceeds to step 815 and initiates a process for iterative disclosure of open-ended questions and answers between the users (i.e. Phase IV).

Alternatively, if either user denies the invitation to proceed, the system ends the matching process between the two present users and determines whether other matches exist for the initiating user's query profile (step 816). If additional matches exist, then the system returns the user to a presented list of the determined candidates for matching less the present target user (step 817) and, upon user selection of one of those remaining candidates, begins a new iteration of the interest phase (i.e. Phase I) (step 819). Alternatively, if no possible matches remain, the system may change, or may request the user to change, the initiating user's selected search query parameters to generate a new set of matched candidates (step 818), from which a new set of candidates may be determined and presented to the user to continue a new iteration of the interest phase (step 819).

Figure 9:
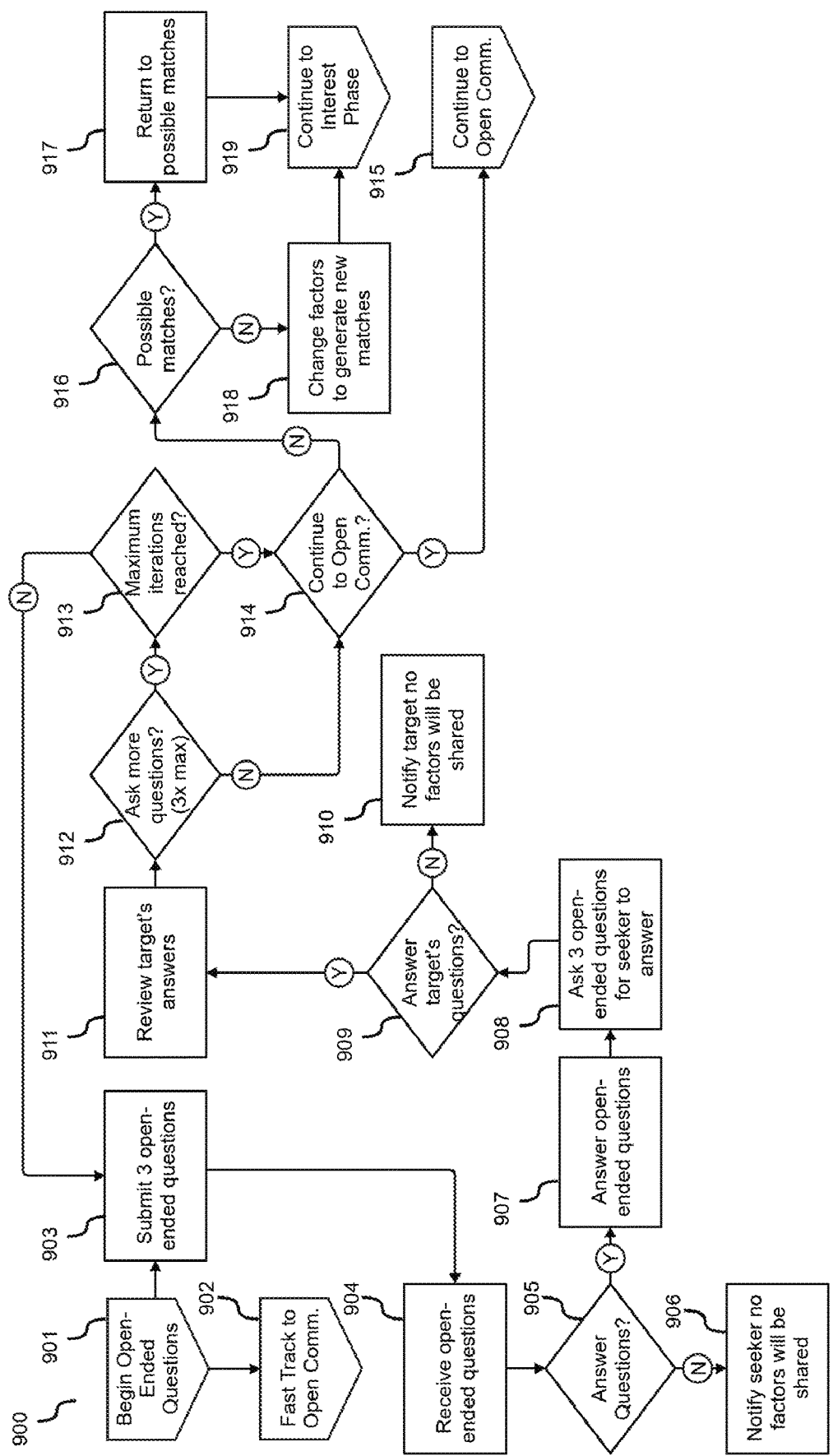
FIG. 9 is a flowchart describing an exemplary matching phase process for procedurally disclosing open-ended questions and answers thereto between the seeker user and target user in accordance with the systems and methods disclosed herein.

FIG. 9 refers to an exemplary method for sharing open-ended questions and answers and may be described as follows. The open-ended question method 900 may begin at step 801 wherein the system has identified two qualified, candidate-matched users who have expressed interest in requesting answers of open-ended questions from one another. In an embodiment, users may at any time during method 900 mutually elect to "Fast Track" communications (step 902), bypassing the remainder of method 900 and subsequent iterative disclosure processes and proceeding to an open communications process.

In step 903, the initiating user may select up to three open-ended questions from a list of available factors for the target user to reveal and may submit those questions to be forwarded to the target. In an embodiment, the user may be permitted to craft his or her own open-ended questions. In step 904, the system alerts the target user to the initiating user's submitted open-ended questions. The system then prompts the target user to provide user-submitted answers to the open-ended questions (step 905). If the target user refuses to answer the open-ended questions, the system may then notify the seeker that the target has refused to answer the questions (step 906). In some embodiments, the target's refusal to answer may automatically terminate the match process. In other embodiments, the system may prompt the initiating user to select alternative questions or may request the initiating user confirm whether or not they wish to continue with the process without answers to the originally submitted questions.

The target user may answer the provided open-ended questions (step 907). In an embodiment, the system may permit the target to choose to answer some, but not all, of the user-submitted questions, and may further permit the target to select which questions to answer. In step 908, the system may then permit the target user to select up to three open-ended questions for the seeker to answer. In an embodiment, the target user may only be able to select up to the number of questions of which the target user answered.

In step 909, The seeker may in turn determine whether to provide answers to the target's submitted questions. In similar embodiments, the seeker may be permitted to select some of the questions to answer. If the seeker rejects answering all questions, the system then notifies the target that the submitted questions will not be answered (step 810). In one embodiment, the matching process may automatically terminate in the event that no questions are answered, whereas in other embodiments, the target may be presented the option of continuing without the requested answers and may be further permitted to select other open-ended questions to submit to the seeker.

Should both parties agree to disclosure of all or the same number of questions and answers in an iteration, the system then presents to each user the other user's answers to respectively submitted questions (step 911). The system may then ask the initiating user whether the seeker would like to submit additional questions in another disclosure iteration (step 912). In an embodiment, the system may also or alternatively prompt the target whether the target wishes to submit additional open-ended questions to the seeker.

If the user requests the submission of additional open-ended questions, the system then determines if the users have reached the maximum limit of disclosure iterations (step 913). For example, the system may be configured to permit only three iterations of three open-ended questions per user. In an alternative embodiment, the system may permit the user to specify and agree upon the number of disclosure iterations permitted. If the users have remaining iterations, the system increases the iteration count by one and repeats steps 903-913. If the users do not have remaining iterations, or if the users do not submit any additional questions to be answered, then the system proceeds to step 914 and prompts both users whether they would like to continue to the open communications phase. If both users accept the invitation to continue to the open communications phase, then the system proceeds to step 915 and initiates a process for real-time, unrestricted messaging and communication between the users (i.e. Phase V).

Alternatively, if either user denies the invitation to proceed, the system ends the matching process between the two present users and determines whether other matches exist for the initiating user's query profile (step 916). If additional matches exist, then the system returns the user to a presented list of the determined candidates for matching less the present target user (step 917) and, upon user selection of one of those remaining candidates, begins a new iteration of the interest phase (i.e. Phase I) (step 919). Alternatively, if no possible matches remain, the system may change, or may request the user to change, the initiating user's selected search query parameters to generate a new set of matched candidates (step 918), from which a new set of candidates may be determined and presented to the user to continue a new iteration of the interest phase (step 919).

Figure 10:
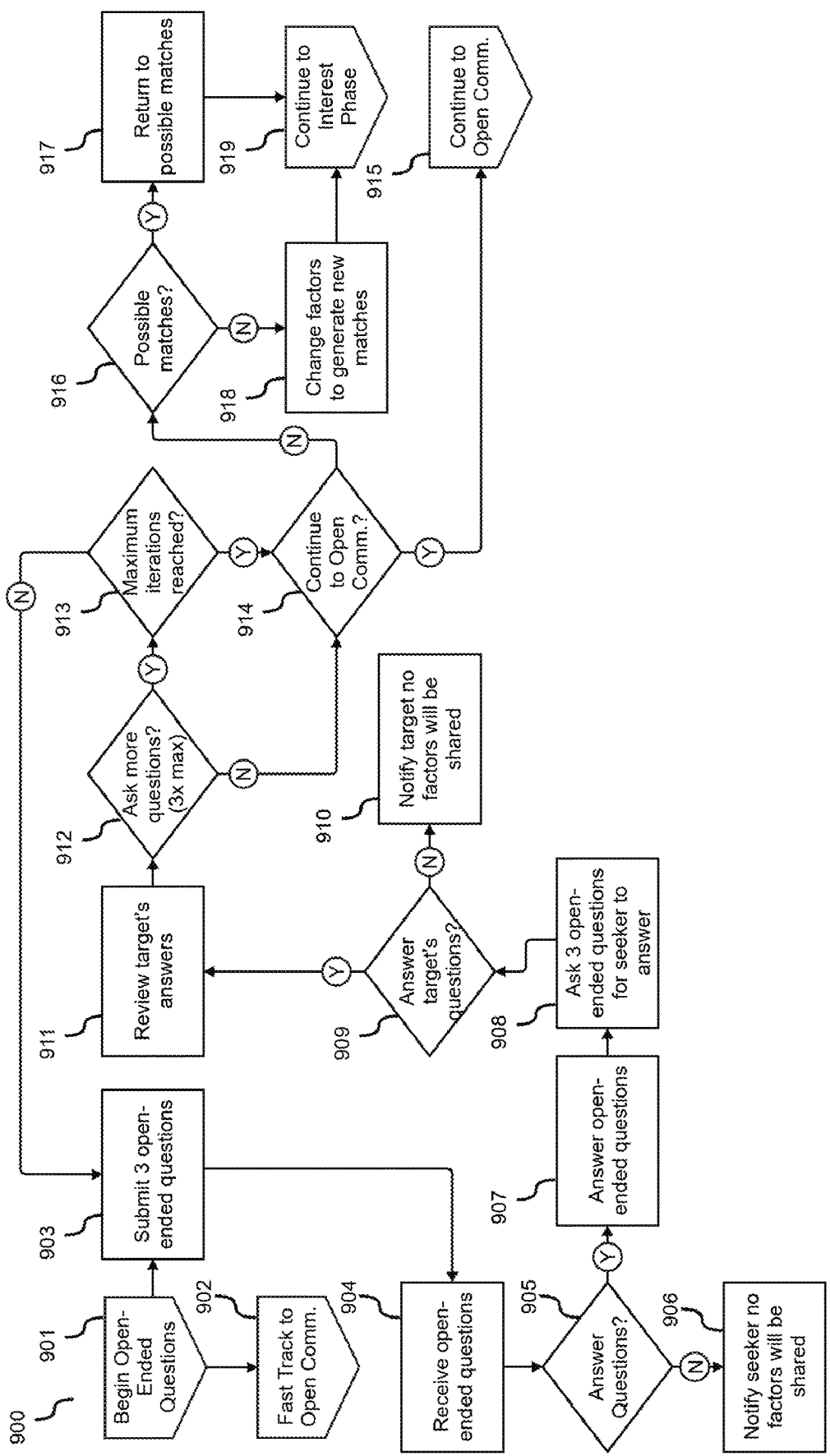
FIG. 10 is a flowchart describing an exemplary matching phase process for enabling open communication between, and facilitator matching for, the seeker user and target user in accordance with the systems and methods disclosed herein.

FIG. 10 refers to an exemplary method for enabling open communications between two matched users and may be described as follows. The open communication method 1000 may begin at step 1001 wherein two matched users specify mutual intent to begin open communication with one another. The system enables open communication between the seeker and the target user (step 1002), such as by permitting the users to send and receive messages to one another. In various embodiments, open communications may be contained within the system, such as via internal messaging software. In an embodiment, the system may disclose previously screened information about the seeker and target, such as masked profile information, contact information, undisclosed firm profile factors, and the like.

During open communications, either user may decide to continue the communications and merger process or alternatively to end the open communication and terminate the potential merger (step 1003). If either user elects to terminate communication and merger, the system ends the merger and communications process between the two present users and determines whether other matches exist for the initiating user's query profile (step 1004). If additional matches exist, then the system returns the user to a presented list of the determined candidates for matching less the present target user (step 1005) and, upon user selection of one of those remaining candidates, begins a new iteration of the interest phase (i.e. Phase I) (step 1007). Alternatively, if no possible matches remain, the system may change, or may request the user to change, the initiating user's selected search query parameters to generate a new set of matched candidates (step 1006), from which a new set of candidates may be determined and presented to the user to continue a new iteration of the interest phase (step 1007).

During open communications, either user may request to engage a merger facilitator (step 1008). Should a user request a facilitator, the system may query one or more available facilitators and present the determined list of facilitators to the requesting party for selection. In step 1009, the user selects a facilitator from the provided list of available facilitators, and in step 1010, the system links the user to an associated facilitator profile page. The facilitator profile page may be a web page or may be a system-specific profile including the facilitator's contact information.

Following selection and inclusion of a facilitator, or, alternatively, upon users' election to continue merger without involving a facilitator, the users may mutually select to commence a merger between the users' respective firms (step 1011). In various embodiments, the system may assist, along with any user-selected facilitator, in the merger process by providing firm information, populating forms, providing checklists, and other elements for determining due diligence in the merger process. In said embodiments, the system may perform ongoing checks to determine if the merger has met a due diligence threshold (step 1012). If the merger does not meet the due diligence threshold, the merger may be abandoned (step 1013) or otherwise suspended. If the merger meets or surpasses the due diligence threshold, then the merger is finalized (step 1014), and the open communications method 1000 and merger process and method end (step 1015).

Figure 11:
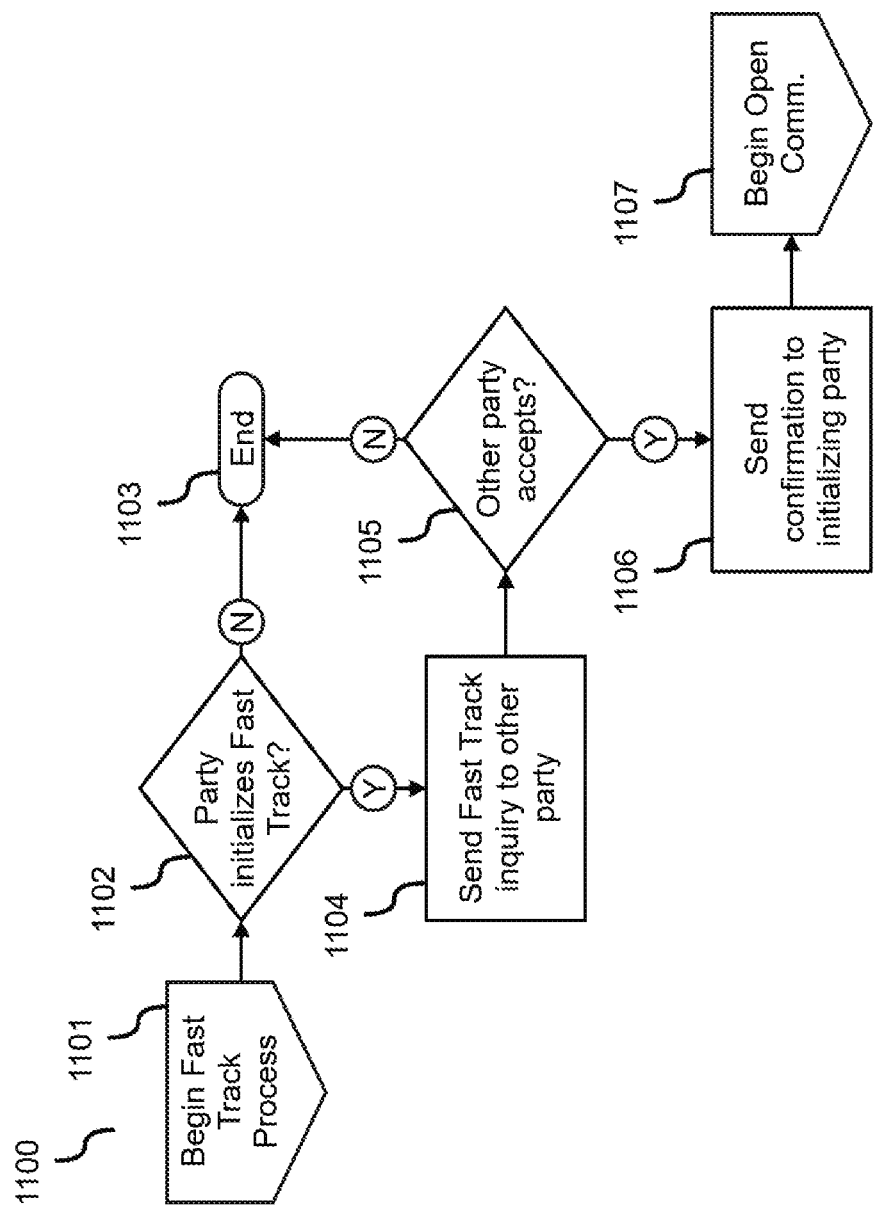
FIG. 11 is a flowchart describing an exemplary process for enabling user-optional expedition bypassing previous phases and permitting open communication between the seeker user and target user in accordance with the systems and methods disclosed herein.

Referring to FIG. 11, an exemplary method 1100 as disclosed herein for enabling user-optional expedition bypassing previous phases and permitting open communication between the seeker user and target user as disclosed herein may be described in part or in whole as follows. The method 1100 begins at step 1101 when two users qualify for the "Fast Track" process. For example, Fast Track may only be available to two users who have matched for potential merger and successfully completed the interest sharing method of Phase I. One user may elect to initialize the Fast Track process during the period of Fast Track availability (step 1102). Users who do not elect to employ Fast Track may continue or terminate the merger process under standard, linear progression of merger exploration as disclosed herein, in which case the expiration of the Fast Track option due to, for example, cancellation of the merger match or standard and complete progression through Phases I-IV, results in the end of the Fast Track option (step 1103). If, alternatively, a user elects to employ Fast Track, the system then sends an inquiry to the other user inviting the other user to employ Fast Track (step 1104). Upon receiving the inquiry, the other user may accept or deny the Fast Track invitation. If the other user denies the Fast Track invitation, the Fast Track process ends (step 1103), and the users proceed in the matching and merger processes as they otherwise would. If the other user accepts the Fast Track invitation, then the system will send a confirmation of acceptance to the first user (step 1106) and then initiate an open communications process (step 1107) such as, for example, method 1000 as described in FIG. 10, bypassing any yet-to-be-completed steps of intermediate Phases (e.g. Phases II-IV; methods 700, 800, 900 supra).

In one embodiment, revenue for the site could be collected from a subscription fee, a territory franchise, or possibly a matching fee. In a further embodiment, revenue may be generated through a subscription fee based upon gross revenue and through referral fees from for provided facilitators. Additional referral fees may be made available through related services advertised through the system and network.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "user interface" as used herein may unless otherwise stated include any input-output module with respect to the hosted server including but not limited to web portals, such as individual web pages or those collectively defining a hosted website, mobile device applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method of providing a system for intermediating anonymous firm matching and exit strategy negotiations, comprising:

for each of a plurality of client users, generating a user account in response to user interaction with a hosted server interface, the user account comprising a unique identifier, a plurality of first profile factors for a firm respective to the client user, one or more second profile factors to match against the first profile factors, and for each of the one or more second profile factors one or more of specific criteria limitations and levels of importance thereof;

selectively adjusting one or more of the plurality of first profile factors with respect to a predicted anonymity risk; and selectively adjusting one or more of the one or more second profile factors, specific criteria limitations, and/or levels of importance based on a comparison against the plurality of first profile factors and with respect to a predicted corresponding likelihood of favorable matches;

executing one or more selection algorithms to match a first client user with one or more of the remaining client users based on at least the first profile factors, second profile factors, specific criteria limitations, and levels of importance thereof;

electronically presenting the first client user with anonymized profiles corresponding to the one or more client users matched to the first client user;

responsive to selection by the first client user of one or more of the anonymized profiles, generating a cooperative interface for confidential and anonymous sharing, among the first client user and the one or more client users corresponding to a respectively selected profile, of client user data corresponding to the selection criteria;

responsive to authorization from each corresponding client user, generating intermediated and anonymous correspondence between the first client user and one or more of the one or more selected client users via a hosted server platform, wherein the hosted server interfaces substantially prevent identification of either client user participating in the intermediated correspondence, wherein the intermediated and anonymous correspondence between client users comprises an iterative addition of shared profile information for successively authorized rounds of intermediated and anonymous correspondence, and opening a direct communication session between respective client users in place of the intermediated and anonymous correspondence after completion of a threshold level of profile information sharing, the direct communication session being secured via a secure channel hosted by the system and configured for intercepting information that would compromise a user's identity and censoring the intercepted information.

2. The method of claim 1, further comprising enabling the first client user to selectively initiate execution of one or more additional iterations of the selection algorithms based on one or more revisions to one or more of selection criteria and non-selection criteria.

3. The method of claim 1, further comprising generating a dynamic questionnaire corresponding to each of the client users in a given intermediated and anonymous correspondence, wherein the iteratively provided profile information corresponds to answers provided by respective client users with respect to the dynamic questionnaire.

4. The method of claim 1, wherein the direct communications are selectively fast-tracked prior to completion of the threshold level of profile information sharing, responsive to mutual agreement of the respective client users.

* * * * *